March 27, 1956
J. W. ROBINSON
2,739,713
CARTRIDGE FOR REMOVING UNDESIRABLE FREE WATER
AND SOLID CONTAMINANT FROM LIQUID HYDROCARBON
Filed Oct. 12, 1953
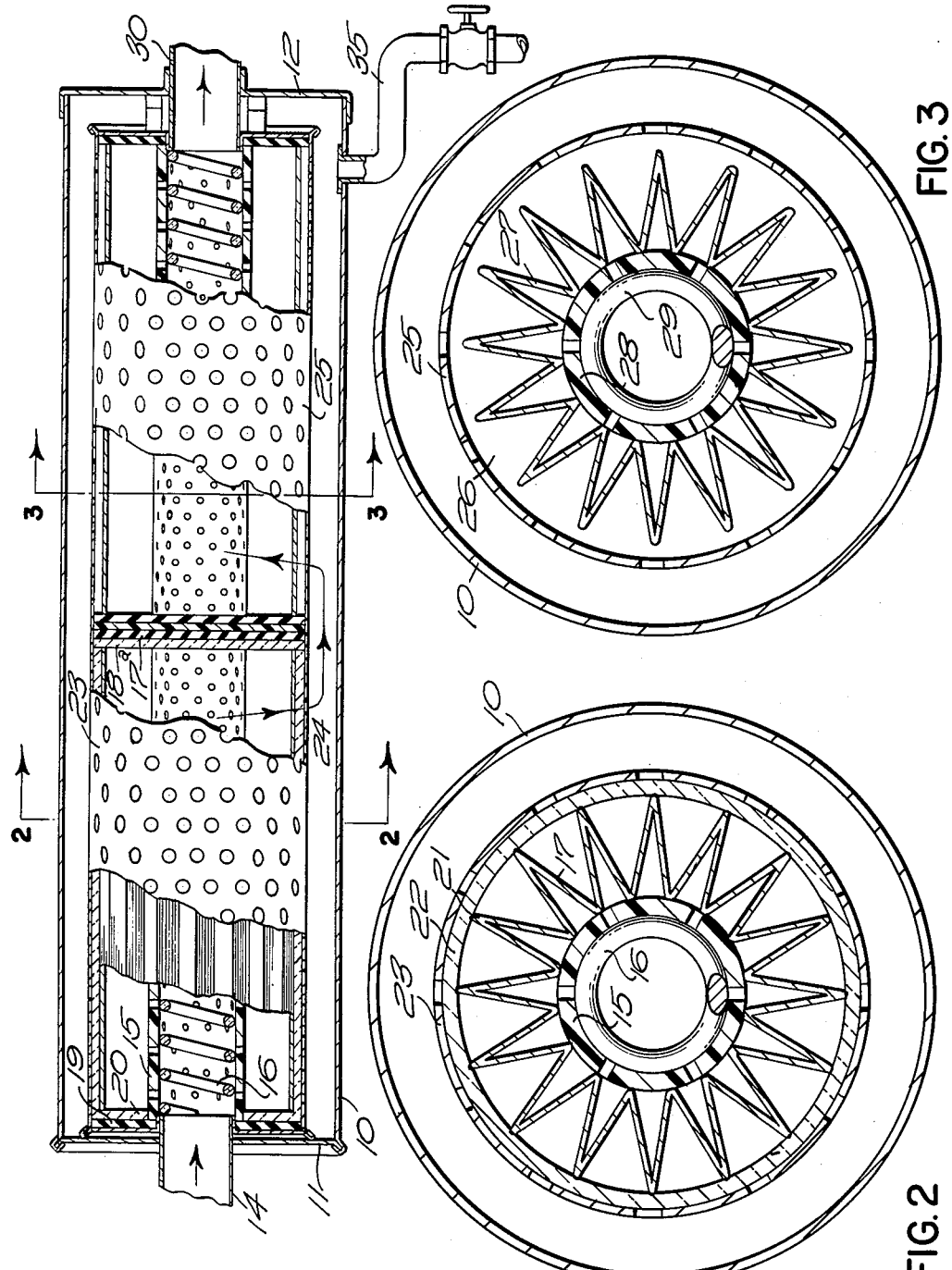
INVENTOR.
JOHN WARREN ROBINSON
BY
*Barlow & Barlow*
ATTORNEYS

United States Patent Office 2,739,713
Patented Mar. 27, 1956

2,739,713

CARTRIDGE FOR REMOVING UNDESIRABLE FREE WATER AND SOLID CONTAMINANT FROM LIQUID HYDROCARBON

John W. Robinson, Richmond, Va., assignor to Fram Corporation, a corporation of Rhode Island Application October 12, 1953, Serial No. 385,468

1 Claim. (Cl. 210—164)

This invention relates to a device for separating undesirable free water and solid contaminant from a liquid hydrocarbon, and more particularly to a single unit in the form of a removable and replaceable cartridge for accomplishing this function.

One of the objects of this invention is to provide a single unit in which there may be performed the function of removing solid contaminant from the hydrocarbon and also of coalescing and removing undesirable free water from the hydrocarbon.

Another object of the invention is to provide an arrangement so that the performance of one function will increase the life of the cartridge in the performance of the other function.

With these and other objects in view, the invention consists of certain novel features of construction as will be more fully described and particularly pointed out in the appended claim.

In the accompanying drawings:

Fig. 1 is a sectional view of one form which may be provided in accomplishing this invention.

Figs. 2 and 3 are sections on lines 2—2 and 3—3 of the structure shown in Fig. 1.

In proceeding with this invention I provide a single unit which is so arranged that when a liquid hydrocarbon is passed through the unit, the hydrocarbon will first pass through a pleated porous paper which is made resistant to the action of the hydrocarbon, and the contaminant which is to be removed is then passed through a medium which will have capillary passages and have a strong affinity for the material which is to be coalesced. In this case, as water is to be coalesced, a hydrophillic medium is provided of glass for this purpose; then the hydrocarbon is passed through a second pleated paper which is porous and treated with a water repellent so that the water which is to be removed will be separated from the hydrocarbon, through the forces of interfacial tension, at this point being held back by the pleated paper while the hydrocarbon is passed through the paper in purified state.

With reference to the drawing which is shown simply by way of illustration, a suitable mounting for the device is illustrated as a tubular casing 10 provided with ends 11 and 12 into and out of which the hydrocarbon material to be freed from contaminants is passed. A drain 35 is provided for the separated water. An entrance conduit 14 is provided at one end communicating with a perforated tubular core 15 internally supported by helical wire 16 and about which pleated paper 17 is arranged as best shown in Fig. 2. This paper is porous to the passage of hydrocarbon but its pore size is sufficient so as to retain solid particles which may be contained in the hydrocarbon. The paper is made resistant to the action of the hydrocarbon and the contaminants or water which may be in the hydrocarbon by the addition of some water and hydrocarbon resistant material, such for instance as a phenolic resin. The liquid is passed outwardly through this paper as the core is blocked off by a diaphragm 17a which serves as a means together with a fiberglass pad 18 to seal the ends of the pleated paper. A similar seal is shown at 19 and 20 at the opposite end of the pleated paper.

Wrapped about the outer folds 21 of the pleated paper there is a bat or medium 22 which will have a strong affinity for the material to be coalesced. In this case a hydrophillic medium which will have a high affinity for water is provided and I have found that glass fibers having an average diameter of 1 micron are highly suitable for this purpose. These fibers mat together in such a way as to provide capillary passages therethrough which serve to coalesce the water which may be present in the hydrocarbon. A perforated metal shell 23 is provided about the medium 22 to assist in retaining it in place about the pleated paper. The hydrocarbon and water, after passing through this medium and out through the perforated supporting tube 23, then passes along the space 24 between the shell 23 and the outer casing 10 and into a similar shell 25 that has an inner chamber 26 completely separate from any part previously described. Within this chamber 26 there is another pleated paper annulus 27 which is similar in many respects to that previously described, this paper being also porous and being provided with a water repellent surface for retaining the coalesced water and preventing it from passing through the paper while the paper will pass the hydrocarbon through it to its interior. This paper is supported by a core 28 perforated throughout its surface, and in turn is supported by a helical wire 29 so that any pressures which exist tending to force the paper inwardly will be resisted by this core. The water is separated from the hydrocarbon at the surface of this pleated paper 27 and is extracted from the chamber 26 as the same may collect therein through the drain 35. The hydrocarbon freed from its water and solid contaminants is then passed out of the case through the conduit 30 as shown by the arrow therein in the purified state which is desired.

It will be readily apparent that I may provide the device above described in some other form than that here illustrated so long as the sequence of solid removing, coalescing, and separating elements are so arranged that the liquid must pass through them in this sequence in its passage through the device. The class of insoluble water repellents which is found useful in this device are silicones which are formed by the interaction or reaction of a class of chloro-silanes with water. Such materials as the chloro-silanes are prone to react with the chemical water of the fiber comprising the structure of the porous paper and they thus become a part of the fiber structure.

In place of the glass which is used, any fine diameter filament may be used so long as the filaments are hydrophillic and form capillary passages for the passage of the hydrocarbon therethrough while the dispersed water is coalesced by its contact with these fibers.

I claim:

In a device for removing undissolved free water and solid contaminants from liquid hydrocarbon, a liquid-tight tubular casing, a tubular filter unit mounted in one end portion of the casing and an aligned tubular filter element of pleated water repellent paper mounted in the other end portion of the casing and a closure wall between them, said unit comprising an annular filter of pleated paper surrounded by a batt of fiber glass that forms a water coalescer and a perforated tube embracing the coalescer, said casing having an inlet at one end and an outlet at the other end so that hydrocarbon liquid passing through the casing will flow in an inside-out direction through the filter and coalescer of said unit and in an outside-in direction against the walls of the water-repellent annulus which will pass the hydrocarbon but block the coalesced water.

References Cited in the file of this patent

UNITED STATES PATENTS

| | | |
|---|---|---|
| 1,787,577 | Hills | Jan. 6, 1931 |
| 2,265,550 | Smith | Dec. 9, 1941 |
| 2,494,382 | Kirkbride et al. | Jan. 10, 1950 |
| 2,555,607 | Robinson | June 5, 1951 |
| 2,556,722 | Hersberger | June 12, 1951 |
| 2,609,932 | Fricke | Sept. 9, 1952 |
| 2,611,490 | Robinson | Sept. 23, 1952 |
| 2,626,709 | Krieble | Jan. 27, 1953 |
| 2,657,808 | Mankin | Nov. 3, 1953 |
| 2,658,848 | Labino | Nov. 10, 1953 |
| 2,701,062 | Robinson | Feb. 1, 1955 |